(12) United States Patent
Tang et al.

(10) Patent No.: US 10,345,965 B1
(45) Date of Patent: Jul. 9, 2019

(54) SYSTEMS AND METHODS FOR PROVIDING AN INTERACTIVE USER INTERFACE USING A FILM, VISUAL PROJECTOR, AND INFRARED PROJECTOR

(71) Applicant: Capital One Services, LLC, McLean, VA (US)

(72) Inventors: Qiaochu Tang, The Colony, TX (US); Stephen Michael Wylie, Carrollton, TX (US); Geoffrey Dagley, McKinney, TX (US); Jason Richard Hoover, Grapevine, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/165,382

(22) Filed: Oct. 19, 2018

Related U.S. Application Data

(63) Continuation of application No. 15/915,702, filed on Mar. 8, 2018.

(51) Int. Cl.
*G06F 3/042* (2006.01)
*G06F 3/0485* (2013.01)
*G06F 3/0481* (2013.01)
*B60J 1/08* (2006.01)

(52) U.S. Cl.
CPC .......... *G06F 3/0425* (2013.01); *G06F 3/0481* (2013.01); *G06F 3/0485* (2013.01); *B60J 1/08* (2013.01); *B60Y 2400/92* (2013.01)

(58) Field of Classification Search
CPC .................................................. G06F 3/0425
See application file for complete search history.

(56) References Cited

U.S. PATENT DOCUMENTS

| 6,654,070 | B1  | 11/2003 | Rofe |
| 8,606,430 | B2  | 12/2013 | Seder et al. |
| 9,784,407 | B2* | 10/2017 | Liao ...................... G06F 3/0423 |

(Continued)

OTHER PUBLICATIONS

Samuel Axon, "Sony's projector that turns your surface into a touchscreen is now available," *Ars Technica*, retrieved Apr. 28, 2018, from https://arstechnica.com/gadgets/2017/10/sonys-projector-that-turns-your-wall-into-a-touchscreen-is-now-available/ (2 pages).

*Primary Examiner* — Lixi C Simpson
(74) *Attorney, Agent, or Firm* — Finnegan, Henderson, Farabow, Garrett & Dunner, LLP

(57) ABSTRACT

The present disclosure relates to interactive projection systems. In one implementation, a system for projecting a user interface may include a film affixed to a surface; a first projector configured to project a user interface onto the film; a second projector configured to project a plurality of light beams such that the plurality of light beams form a plane above the film that does not intersect the film; and an image sensor configured to receive reflections caused by the projected plurality of light beams. The system may further include at least one processor configured to receive an indication of a reflection from the image sensor; determine a location associated with the reflection; in response to the received indication, determine a change for the user interface based on the determined location; and transmit a command to the first projector to modify the projected user interface according to the determined change.

16 Claims, 10 Drawing Sheets

(56) References Cited

U.S. PATENT DOCUMENTS

| | | | |
|---|---|---|---|
| 2006/0145825 A1* | 7/2006 | McCall | B60R 25/2045 |
| | | | 340/426.35 |
| 2011/0242054 A1* | 10/2011 | Tsu | G06F 3/0425 |
| | | | 345/175 |
| 2012/0162077 A1 | 6/2012 | Sze et al. | |
| 2013/0006775 A1 | 1/2013 | Jordan et al. | |
| 2013/0314380 A1 | 11/2013 | Kuribayashi | |
| 2016/0012655 A1* | 1/2016 | Hanson | G07C 9/00039 |
| | | | 340/5.54 |
| 2016/0227897 A1* | 8/2016 | Jobling | G09F 3/0291 |
| 2017/0237945 A1 | 8/2017 | Murar et al. | |

* cited by examiner

SYSTEMS AND METHODS FOR PROVIDING AN INTERACTIVE USER INTERFACE USING A FILM, VISUAL PROJECTOR, AND INFRARED PROJECTOR

CROSS-REFERENCE TO RELATED APPLICATIONS

This application is a continuation of U.S. application Ser. No. 15/915,702, filed Mar. 8, 2018. The contents of the above are incorporated herein by reference in their entirety.

TECHNICAL FIELD

This disclosure relates generally to the field of interactive user interfaces. More specifically, and without limitation, this disclosure relates to systems and methods for providing an interactive interface using a film, a visual projector, and an infrared projector.

BACKGROUND

There are many instances in which an interactive touchscreen may be used to replace a stationary sign, such as a retail display, an informational kiosk, or the like. However, there are environments in which a touchscreen is too bulky or heavy to effectively replace a stationary sign. For example, automobile dealerships use paper adhered to vehicle windows to convey information to potential consumers. Such paper may be easily ripped or defaced, and can only display a limited amount of information. A touchscreen would be advantageous as it would enable the display of more (and more dynamic) information. However, an interactive touchscreen may be unsuitable for adherence to vehicle windows on account of the weight of the touchscreen, which may require a strong adhesive that may be damaging to the vehicle window.

In another example, a seller for a home may use paper on a for sale sign to convey information to potential consumers. However, an interactive touchscreen may be unsuitable for this use on account of its sensitivity to the elements, such as rain, snow, or the like.

SUMMARY

Disclosed systems and methods for generating a user interface using a film, a visual projector, and an infrared projector and enabling interaction with the generated interface. Accordingly, disclosed systems and methods result in an improved user interface over extant projected interfaces, which are generally static. Moreover, disclosed systems and methods may allow for selective power control and interface generation along with dynamic interface generation to incorporate customization. Accordingly, disclosed systems and methods result in a more energy-efficient system along with an improved user interface over extant projected interfaces, which are generally generic. Finally, disclosed systems and methods may allow for dynamic interface generation and/or power control to allay privacy concerns. Accordingly, disclosed systems and methods use a technical solution to solve privacy concerns that inhere in the use of customized interfaces.

There are many possible applications for such capabilities. Examples of applications include use on vehicle windows, e.g., in the context of an automobile dealership. Additional examples of application may include use on for sale signs for property, e.g., in the context of home sales.

According to an exemplary embodiment of the present disclosure, a system for projecting a user interface onto a film may comprise a film, a first projector, a second projector, an image sensor, and at least one processor. The film may be affixed to a surface. The first projector may be configured to project a user interface onto the film, and the second projector may be configured to project a plurality of light beams such that the plurality of light beams form a plane above the film that does not intersect the film. The image sensor may be configured to receive reflections caused by the projected plurality of light beams, and the at least one processor may be configured to perform operations that may comprise: receiving an indication of a reflection from the image sensor; determining a location associated with the reflection; in response to the received indication, determining a change for the user interface based on the determined location; and transmitting a command to the first projector to modify the projected user interface according to the determined change.

According to another embodiment of the present disclosure, a system for projecting a user interface onto a film may comprise a film, a first projector, a second projector, an image sensor, and at least one processor. The film may be affixed to a surface. The first projector may be configured to project a user interface onto the film, and the second projector may be configured to project a plurality of light beams such that the plurality of light beams form a plane above the film that does not intersect the film. The image sensor may be configured to receive reflections and may have a processing core configured to determine locations associated with received reflections caused by the projected plurality of light beams, and the at least one processor may be configured to perform operations that may comprise: receiving an indication of a reflection and a location associated with the reflection from the processing core; in response to the received indication, determining a change for the user interface based on the received location; and transmitting a command to the first projector to modify the projected user interface according to the determined change.

According to an exemplary embodiment of the present disclosure, a system for projecting a user interface onto a film may comprise a film, a projector, and at least one processor. The film may be affixed to a surface. The projector may be configured to project a user interface onto the film and may include an image sensor configured to receive reflections caused by the projected user interface. The at least one processor may be configured to perform operations that may comprise receiving an indication of a reflection from the image sensor; determining a location associated with the reflection; in response to the received indication, determining a change for the user interface based on the determined location; and transmitting a command to the projector to modify the projected user interface according to the determined change.

According to another embodiment of the present disclosure, a system for projecting a user interface onto a film may comprise a film, a first projector, a second projector, an image sensor, and at least one processor. The film may be affixed to a surface. The first projector may be configured to project a user interface onto the film, and the second projector may be adapted to have a power on mode and a low power mode and configured to project a plurality of light beams such that the plurality of light beams form a plane above the film that does not intersect the film. The image sensor may be configured to receive reflections caused by the projected plurality of light beams, and the at least one processor may be configured to perform operations that may comprise receiving an indication of proximity of a mobile device; in response to the indication of proximity, transmitting a command to the second projector to switch from the low power mode to the power on mode; generating a user interface; and transmitting a command to the first projector to project the generated user interface.

According to an exemplary embodiment of the present disclosure, a system for projecting a user interface onto a film may comprise a film, a first projector, a second projector, an image sensor, and at least one processor. The film may be affixed to a surface. The first projector may be configured to project a user interface onto the film, and the second projector may be adapted to have a power on mode and a low power mode and configured to project a plurality of light beams such that the plurality of light beams form a plane above the film that does not intersect the film. The image sensor may be configured to receive reflections caused by the projected plurality of light beams and may have a processing core configured to determine locations associated with received reflections, and the at least one processor may be configured to perform operations that may comprise receiving an indication of proximity of a mobile device; in response to the indication of proximity, transmitting a command to the second projector to switch from the low power mode to the power on mode; generating a user interface; and transmitting a command to the first projector to project the generated user interface.

According to another embodiment of the present disclosure, a system for projecting a user interface onto a film may comprise a film, a projector, and at least one processor. The film may be affixed to a surface. The projector may be adapted to have a power on mode and a low power mode and configured to project a user interface onto the film and may include an image sensor configured to receive reflections caused by the projected user interface. The at least one processor may be configured to perform operations that may comprise receiving an indication of proximity of a mobile device; in response to the indication of proximity, transmitting a command to the projector to switch from the low power mode to the power on mode; generating a user interface; and transmitting a command to the projector to project the generated user interface.

Additional embodiments of the present disclosure include non-transitory computer-readable media storing instructions that cause one or more processors to execute any of the methods disclosed herein.

Additional objects and advantages of the present disclosure will be set forth in part in the following detailed description, and in part will be obvious from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the disclosed embodiments.

BRIEF DESCRIPTION OF THE DRAWINGS

The accompanying drawings, which comprise a part of this specification, illustrate several embodiments and, together with the description, serve to explain the disclosed principles. In the drawings.

DETAILED DESCRIPTION

Figure 1:
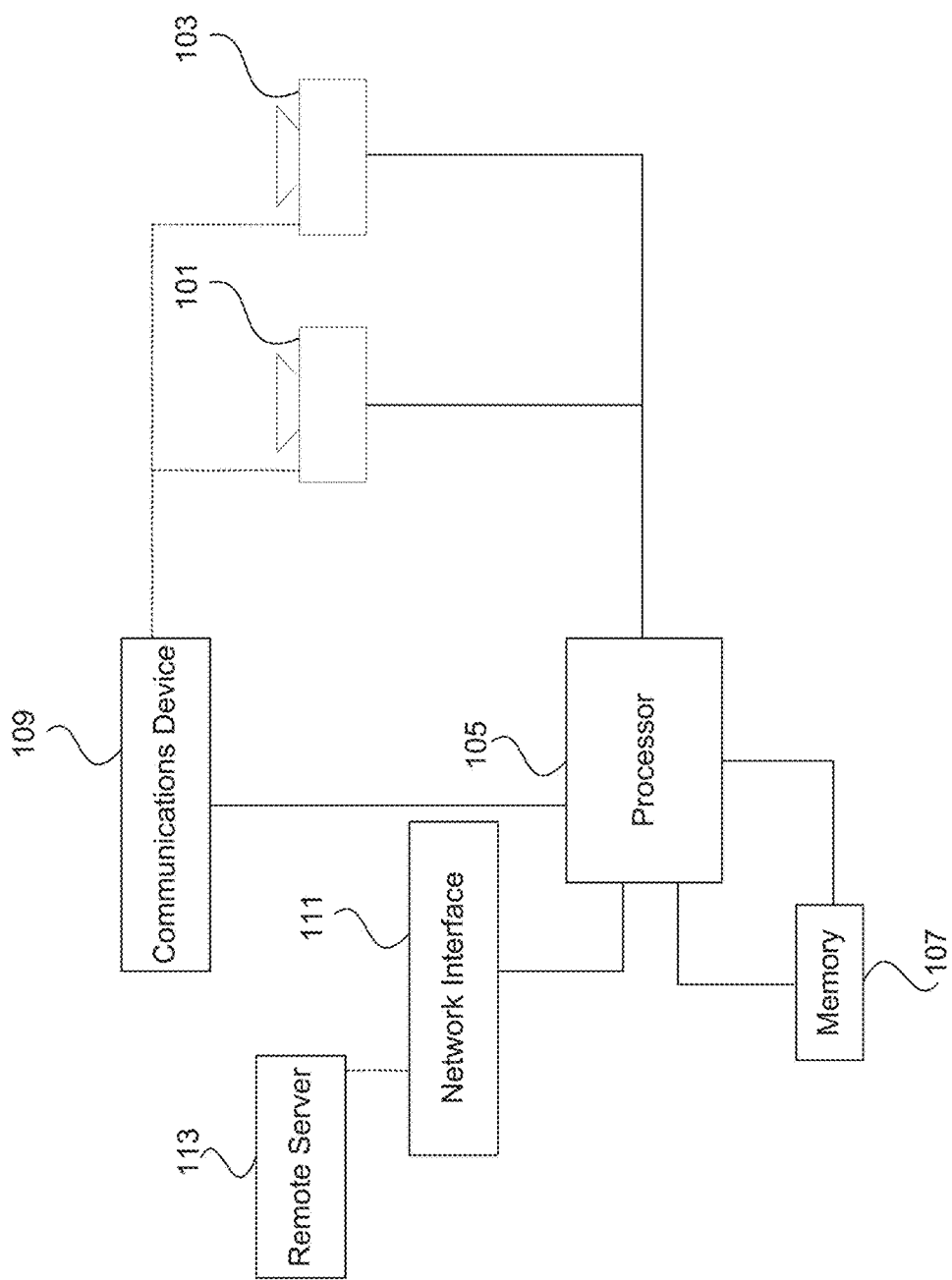
FIG. 1 is a schematic representation of an example interactive projection system, consistent with embodiments of the present disclosure.

The disclosed embodiments relate to systems and methods for providing an interactive interface using a film, a visual projector, and an infrared projector. Embodiments of the present disclosure may be implemented using a film, a first projector, a second projector, an image sensor and at least one processor, as described below. In some embodiments, the at least one processor may comprise a microprocessor, such as a central processing unit (CPU), a graphics processing unit (GPU), or other electronic circuitry capable of carrying out the instructions of a computer program by performing the operations specified by the instructions. Alternatively or concurrently, the at least one processor may comprise one or more special-purpose devices built according to embodiments of the present disclosure using suitable circuit elements, e.g., one or more application-specific integrated circuits (ASICs), field-programmable gate arrays (FPGAs), or the like.

According to an aspect of the present disclosure, an interactive projection system may comprise a film, a first projector, a second projector, an image sensor, and at least one processor. For example, the film may comprise any material configured to reflect light projected from at least one angle away from the film. The film may be lightweight. For example, it may comprise one or more plastics.

The first projector may comprise any optical device configured to shine light onto a surface. For example, the projector may use one or more light bulbs, one or more lasers, or any combination thereof, in order to generate the light. In some embodiments, the projector may further comprise a focusing device (e.g., one or more lenses). The light may be generated according to one or more inputs to the projector, e.g., in order to form an image or a series of images. Accordingly, the projector may be configured to project a user interface onto the film.

The second projector may comprise any optical device configured to shine light over and not intersecting with a surface. For example, the projector may use one or more light bulbs, one or more lasers, or any combination thereof, in order to generate the light. In some embodiments, the light may comprise non-visible light, such as infrared light. In some embodiments, the projector may further comprise a focusing device (e.g., one or more lenses).

In some embodiments, the first projector and the second projector may be encased together within a housing. For example, the housing may have a first aperture for allowing visible light from the first projector to travel to the film and may have a second aperture for allowing non-visible light from the second projector to form a plane above the film.

The image sensor may comprise any sensor for converting a visual signal into digital signal. For example, the image sensor may comprise a charge-coupled device (CCD), a complementary metal-oxide-semiconductor (CMOS), an N-type metal-oxide-semiconductor (NMOS), an array of photoresistors, an array of phototransistors, or any other sensor capable of converting received light into digital signals. The image sensor may be configured to receive reflections caused by a plurality of light beams projected from the second projector or, in embodiments where the first projector and the second projector are combined, from a combined projector. Additionally or alternatively, the image sensor may be configured to capture gaps or shadows in the plurality of light beams.

In some embodiments, the image sensor may be separate from the first projector and/or the second projector. Alternatively, the image sensor may form a portion of the second projector. In embodiments where the first projector and the second projector are combined, the image sensor may be separate from the combined projector or form a portion of the combined projector.

The at least one processor may be remote from the first projector, the second projector, and the image sensor. Additionally or alternatively, the at least one processor may encased within a housing with the first projector and/or within a housing with the second projector. For example, the housing may comprise a shell formed of plastic and/or metal to include the projector and the at least one processor.

In one embodiment, the at least one processor may be configured to receive an indication of a reflection from the image sensor. For example, the image sensor may send a signal indicating detection of a reflection along with associated properties, such as time of receipt of the reflection, angle of receipt of the reflection, wavelength of the reflection, intensity of the reflection, location of the reflection within the field of view of the image sensor, or the like. The at least one processor may perform filtering using one or more of the received properties. For example, an indication with an intensity below a particular threshold may be determined to be a false positive.

The at least one processor may be further configured to determine a location associated with the reflection. For example, the at least one processor may calculate time-of-flight of the reflection to calculate a depth and determine the location based on the calculated depth and the location of the reflection within the field of view of the image sensor. Additionally or alternatively, the at least one processor may calculate the depth based on a shift in wavelength of the reflection. Additionally or alternatively, the at least one processor may calculate the depth based on an angle of receipt of the reflection.

In other embodiments, the at least one processor may be configured to receive an indication of a reflection and a location associated with the reflection from a processing core of the image sensor. Accordingly, the processing core may receive an indication of a reflection from the image sensor and determine a location associated with the reflection in a manner similar to the at least one processor, described above.

Alternatively, the at least one processor may be configured to receive an indication of a shadow (e.g., on the film) from the image sensor. For example, the image sensor may capture images of the film such that any gaps in the light projected from the second projector or any shadow caused by such a gap are visible in the captured images. Accordingly, the image sensor may comprise an infrared sensor or other non-visible light wave image sensor. The image sensor may send a signal indicating capture of the image along with associated properties of the image, such as time of capture of the image, or the like. The at least one processor may perform filtering using one or more of the received properties. For example, an image having a gap or shadow with a size below a particular threshold and/or a sharpness below a particular threshold may be determined to be a false positive. Additionally or alternatively, a gap or shadow appearing in a number of images below a threshold (e.g., in only one or two images) and/or appearing for a short duration in time (e.g., in one or more images spanning less than 1 second or the like) may be determined to be a false positive. These same filtering metrics may also be applied to reflections.

The at least one processor may be further configured to determine a location associated with the gap or shadow. For example, the at least one processor may perform depth analysis on the captured image to determine the location of the gap or shadow within the field of view of the image sensor. In other embodiments, the at least one processor may be configured to receive an indication of a gap or shadow and a location associated with the gap or shadow from a processing core of the image sensor. Accordingly, the processing core may receive an indication of a gap or shadow from the image sensor and determine a location associated with the gap or shadow in a manner similar to the at least one processor, described above.

The at least one processor may be further configured to, in response to the received indication, determine a change for the user interface based on the determined (or received) location. For example, the at least one processor may determine a popup window to be generated if the location is within one or more regions of the film. In another example, the at least one processor may determine a new user interface to be generated if the location is within one or more regions of the film. In yet another example, the at least one processor may determine no change if the location is within one or more regions of the film.

In certain aspects, the reflection may be monitored for changes (or for the lack thereof) across a period of time and/or across locations of the film. For example, the at least one processor may receive a plurality of signals from the image sensor in a temporal sequence such that the reflection may be tracked. In such aspects, the determined change may be further based on the monitored change and/or the magnitude of the period of time. For example, the at least one processor may determine a popup window to be generated if the reflection remains in the same location for a threshold period of time. In another example, the at least one processor may determine a new user interface to be generated if the location of the reflection moves across the film in one or more patterns.

The at least one processor may be further configured to transmit a command to the first projector to modify the projected user interface according to the determined change. For example, the at least one processor may send one or more graphics comprising a user interface incorporating the determined change to the first projector. The one or more graphics may be sent via a wired connection to the first projector and/or via a wireless connection to the first projector.

In one embodiment, at least one processor may be configured to receiving an indication of proximity of a mobile device. For example, the at least one processor may receive global positioning system (GPS) coordinates and/or other positional indicators (such as received signal strength, time of arrival one or more network signals at the mobile device, angle of arrival of one or more network signals at the mobile device, or the like) from which the at least one processor may determine a location of the mobile device. Alternatively, the mobile device may calculate its own location and send the location directly to the at least one processor.

The at least one processor may be further configured to, in response to the indication of proximity, transmit a command to the first projector and/or to the second projector to power on. In embodiments where the first projector and/or the second projector are adapted to have a power on mode and a low power mode, the at least one processor may transmit a command to the first projector and/or to the second projector to switch from the low power mode to the power on mode. In any of the examples above, the at least one processor may send the command(s) via a wired connection to the first projector and/or the second projector and/or via a wireless connection to the first projector and/or the second projector.

The at least one processor may be further configured to generate a user interface. For example, the at least one processor may generate one or more graphics and may layer the one or more graphics to form the user interface. The at least one processor may retrieve the one or more graphics from one or more memories (e.g., a volatile memory such as a random access memory (RAM) or a non-volatile memory such as a hard disk drive or flash memory).

The at least one processor may be further configured to transmit a command to the first projector to project the generated user interface onto the film. For example, as explained above, the at least one processor may send the one or more graphics comprising the user interface to the first projector. The one or more graphics may be sent via a wired connection to the first projector and/or via a wireless connection to the first projector.

The at least one processor may be further configured to receive an indication that the mobile device is beyond a proximity threshold. The proximity threshold may comprise, for example, a shortest distance threshold, a Lebesgue distance, a distance along a single axis, or the like. For example, the at least one processor may receive updated GPS coordinates and/or other updated positional indicators (such as received signal strength, time of arrival of one or more network signals at the mobile device, angle of arrival of one or more network signals at the mobile device, or the like) from which the at least one processor may determine an updated location of the mobile device. Alternatively, the mobile device may calculate its own updated location and send the location directly to the at least one processor. The at least one processor may then determine whether the updated location is outside a particular threshold (e.g., more than 10 meters from a particular location, more than 20 feet from a particular location, or the like). The particular threshold may comprise the proximity threshold. Moreover, the proximity threshold may vary by direction, e.g., 10 feet in a plurality of directions (e.g., defined by an angle range) and yet 30 feet in another plurality of directions (e.g., defined by a different angle range). Thus, the at least one processor may react to mobile devices approaching a front of the film with a proximity threshold that is relaxed compared to that for mobile devices approaching a back of the film.

The at least one processor may be further configured to, in response to the indication that the mobile device is beyond the proximity threshold, transmit a command to the first projector and/or to the second projector to power off. In embodiments where the first projector and/or the second projector are adapted to have a power on mode and a low power mode, the at least one processor may transmit a command to the first projector and/or to the second projector to switch from the power on mode to the low power mode. In any of the examples above, the at least one processor may send the command(s) via a wired connection to the first projector and/or the second projector and/or via a wireless connection to the first projector and/or the second projector.

In any of the embodiments above, the at least one processor may be further configured to receive one or more indicators of interest associated with the mobile device. For example, the at least one processor may receive the indicators from one or more applications running on the mobile device. Additionally or alternatively, the at least one processor may use an authorization obtained from the mobile device to retrieve the indicators form one or more remote servers.

The at least one processor may be further configured to generate a customized user interface based on the one or more indicators. For example, the at least one processor may select and/or organize one or more graphics (and/or text) comprising the customized user interface to prioritize graphics and text aligned with the indicators of interest. For example, the at least one processor may map the indicators of interest to one or more predetermined profiles having one or more characteristics and may select the graphics and text using a relational database indexing characteristics to graphics and text. Additionally or alternatively, the at least one processor may determine strength scores for each indicator of interest and then organize the selected graphics and text to prioritize those matching indicators with the highest scores.

The at least one processor may be further configured to transmit a command to the first projector to project the customized user interface. For example, the at least one processor may send the command via a wired connection to the first projector and/or via a wireless connection to the first projector.

In such embodiments, the at least one processor may be further configured to determine one or more automotive preferences based on the one or more indicators. For example, as explained above, the indicators may be mapped to one or more automotive preferences, e.g., using a relational database and/or feature model. For example, an automotive preference may comprise one or more characteristics of a user that may influence a vehicle purchase, such as liking outdoors, caring for the environment, having a job as a contractor, or the like. Accordingly, generating the customized user interface may be based on the one or more automotive preferences, similar to the generation based on the indicators explained above.

Additionally or alternatively, the at least one processor may be further configured to receiving an indication that the mobile device is beyond a proximity threshold, as explained above, or may receive a second indication of proximity of a second mobile device (e.g., the at least one processor may receive GPS coordinates and/or other positional indicators from which the at least one processor may determine a location of the second mobile device, or may receive the location directly from the second mobile device and may then determine whether the location of the second mobile device is within a particular threshold that may comprise the proximity threshold). In response to the indication that the mobile device is beyond the proximity threshold and/or receiving the second indication, the at least one processor may generate a default user interface and transmit a command to the first projector to replace the customized user interface with the default user interface. For example, the at least one processor may send the command via a wired connection to the projector and/or via a wireless connection to the first projector.

Embodiments of the present disclosure also relate to methods and computer-readable media that implement the above embodiments.

Reference will now be made in detail to exemplary embodiments and aspects of the present disclosure, examples of which are illustrated in the accompanying drawings.

FIG. 1 is a schematic representation of example interactive projection system 100. As depicted in FIG. 1, system 100 may include a first projector 101 and a second projector 103 in communication with a processor 105 (e.g., via a wired connection). Additionally or alternatively, first projector 101 and/or second projector 103 may communicate with a communications device 109 (e.g., via a wired connection and/or a wireless connection). Projector 101 may be configured to project a user interface onto a film (not shown), and projector 103 may be configured to project a plurality of light beams such that the plurality of light beams form a plane above the film that does not intersect the film.

Although not depicted in FIG. 1, system 100 may include an image sensor. For example, image sensor may be separate from or included in second projector 103. The image sensor may be in communication with processor 105 to transmit indications of reflections (or gaps or shadows) caused by the projected plurality of light beams. Additionally or alternatively, the image sensor may communicate with communications device 109 (e.g., via a wired connection and/or a wireless connection) to transmit the indications. Alternatively, the image sensor may include a processing core configured to determine locations associated with received reflections (or gaps or shadows) caused by the projected plurality of light beams and may transmit the determined locations (e.g., to processor 105 and/or via communications device 109).

Processor 105 may further be in communication with memory 107. For example, memory 107 may store the indications (or locations) from the image sensor and/or data from processor 105.

As further depicted in FIG. 1, system 100 may further include a network interface 111 in communication with processor 105. For example, network interface 111 may communicate (e.g., via a wired connection and/or a wireless connection) with one or more remote servers (such as remote server 113).

Figure 2:
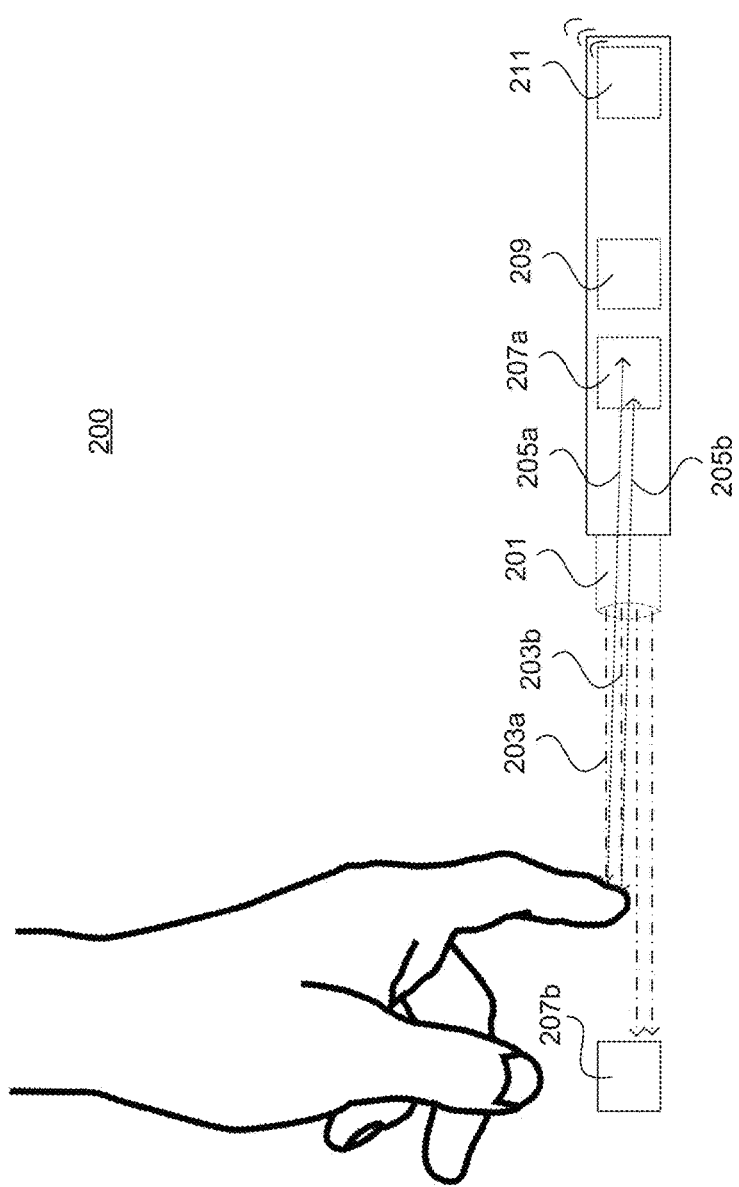
FIG. 2 is a schematic representation of an example second projector for an interactive projection system, consistent with embodiments of the present disclosure.

FIG. 2 is a schematic representation of example second projector 200. Example projector 200 may be used in, for example, interactive projection system 100 of FIG. 1. Although depicted as using a laser-based illumination system, projector 200 may additionally or alternatively use a bulb-based illumination system.

Second projector 200 may include an illumination system (not shown) that produces a plurality of light beams, e.g., beam 203a and beam 203b. In some embodiments, beams 203a and 203b may pass through a focusing system 201 (e.g., including one or more lenses). In embodiments where the illumination system is laser-based, second projector 200 may lack focusing system 201 because the laser(s) may be self-focusing.

Beams 203a and 203b may reflect off objects in the environment of second projector 200. For example, as depicted in FIG. 2, beams 203a and 203b may reflect off a finger of a user and cause a plurality of reflections (e.g., reflection 205a and reflection 205b) to be sent back towards second projector 200. Reflections 205a and 205b caused by beams 203a and 203b may be received by image sensor 207a.

Additionally with or alternatively to image sensor 207a, an image sensor 207b may be located across a film (not shown) over which the plurality of beams (e.g., beams 203a and 203b) are projected. In such an embodiment, as explained above, image sensor 207b may detect gaps or shadows caused by a finger of a user in addition to or in lieu of image sensor 207a detecting reflections 205a and 205b. Accordingly, some embodiments may use both image sensors 207a and 207b while other embodiments may only use one of image sensors 207a and 207b.

In some embodiments, second projector 200 may further include a processor 209 and/or a wireless communications device 211. Processor 209 may comprise a standalone processor and/or a processing core of image sensor 207. For example, processor 209 may perform one or more steps of the methods disclosed herein, perform filtering on received reflections (or gaps of shadows) to remove false positives (as described above), and/or may process received reflections (or gaps or shadows) to determine corresponding locations. Wireless communications device 211 may communicate over one or more wireless networks.

Second projector 200 may further include a power control and/or a ventilation system, as explained below with respect to first projector 300. In embodiments where second projector 200 uses one or more low-powered lasers as the illumination system, second projector 200 may lack a ventilation system as the cooling therefrom may not be necessary. Additionally or alternatively, second projector 200 may be wired for communications, e.g., via a Video Graphics Array (VGA) connector, a High-Definition Multimedia Interface (HDMI), or the like.

Figure 3:
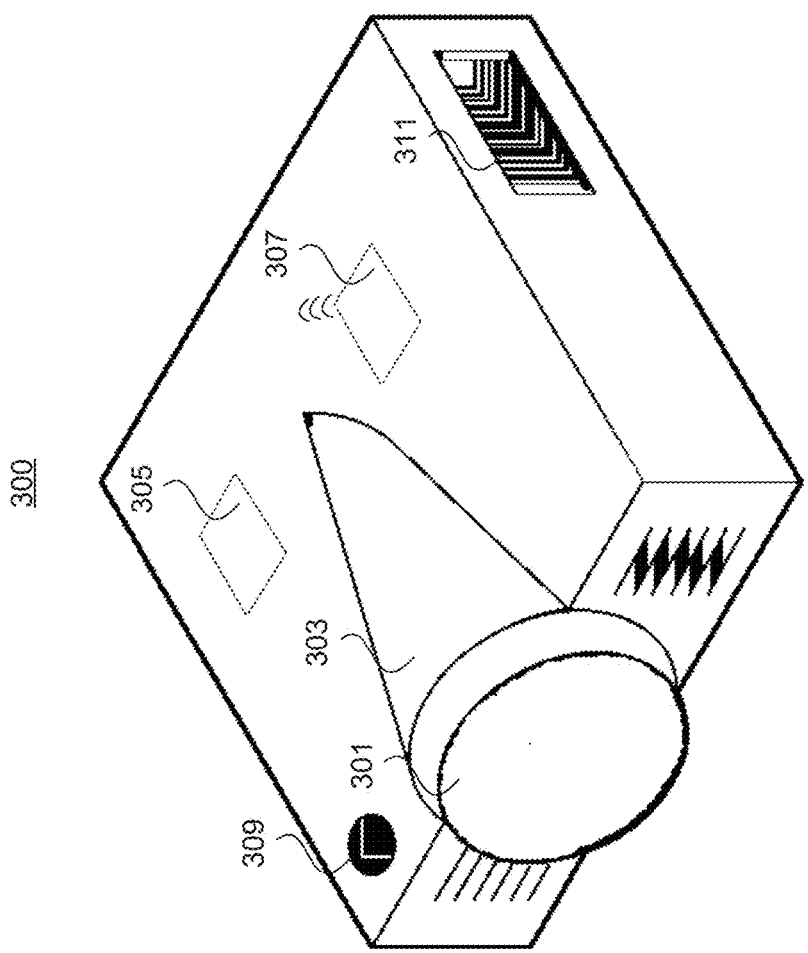
FIG. 3 is a schematic representation of an example first projector for an interactive projection system, consistent with embodiments of the present disclosure.

FIG. 3 is a schematic representation of example first projector 300. Example first projector 300 may be used in, for example, interactive projection system 100 of FIG. 1. Although depicted as using a bulb-based illumination system, first projector 300 may additionally or alternatively use a laser-based illumination system.

As depicted in FIG. 3, first projector 300 may include an illumination system 303 (e.g., one or more bulbs) and a focusing system 301 (e.g., including one or more lenses). In embodiments where illumination system 303 is laser-based, first projector 300 may lack focusing system 301 because the laser(s) may be self-focusing.

In some embodiments, first projector 300 may further include a processor 305 and/or a wireless communications device 307. For example, processor 305 may perform one or more steps of the methods disclosed herein and/or may process received graphics into images for projection. Wireless communications device 307 may communicate over one or more wireless networks. Additionally or alternatively, first projector 300 may be wired for communications, e.g., via a Video Graphics Array (VGA) connector, a High-Definition Multimedia Interface (HDMI), or the like.

As further depicted in FIG. 3, first projector 300 may include a power control 309 (e.g., a button or switch) and/or a ventilation system 311. In embodiments where first projector 300 uses one or more low-powered lasers as illumination system 303, first projector 300 may lack ventilation system 311 as the cooling therefrom may not be necessary.

Although depicted as separate, first projector 300 and second projector 200 may be encased within the same housing. Alternatively, first projector 300 and second projector 200 may be combined such that an image sensor is configured to receive reflections (or gaps or shadows) from the projected user interface rather than from a separate plurality of light beams that form a plane.

In embodiments where the first projector 300 and second projector 200 are combined, the image sensor may be configured to capture images in which a gap or shadow in the light projected from the combined projector (that is, a gap or shadow in the projected user interface) is visible in the captured images, as explained above.

Figure 4A:
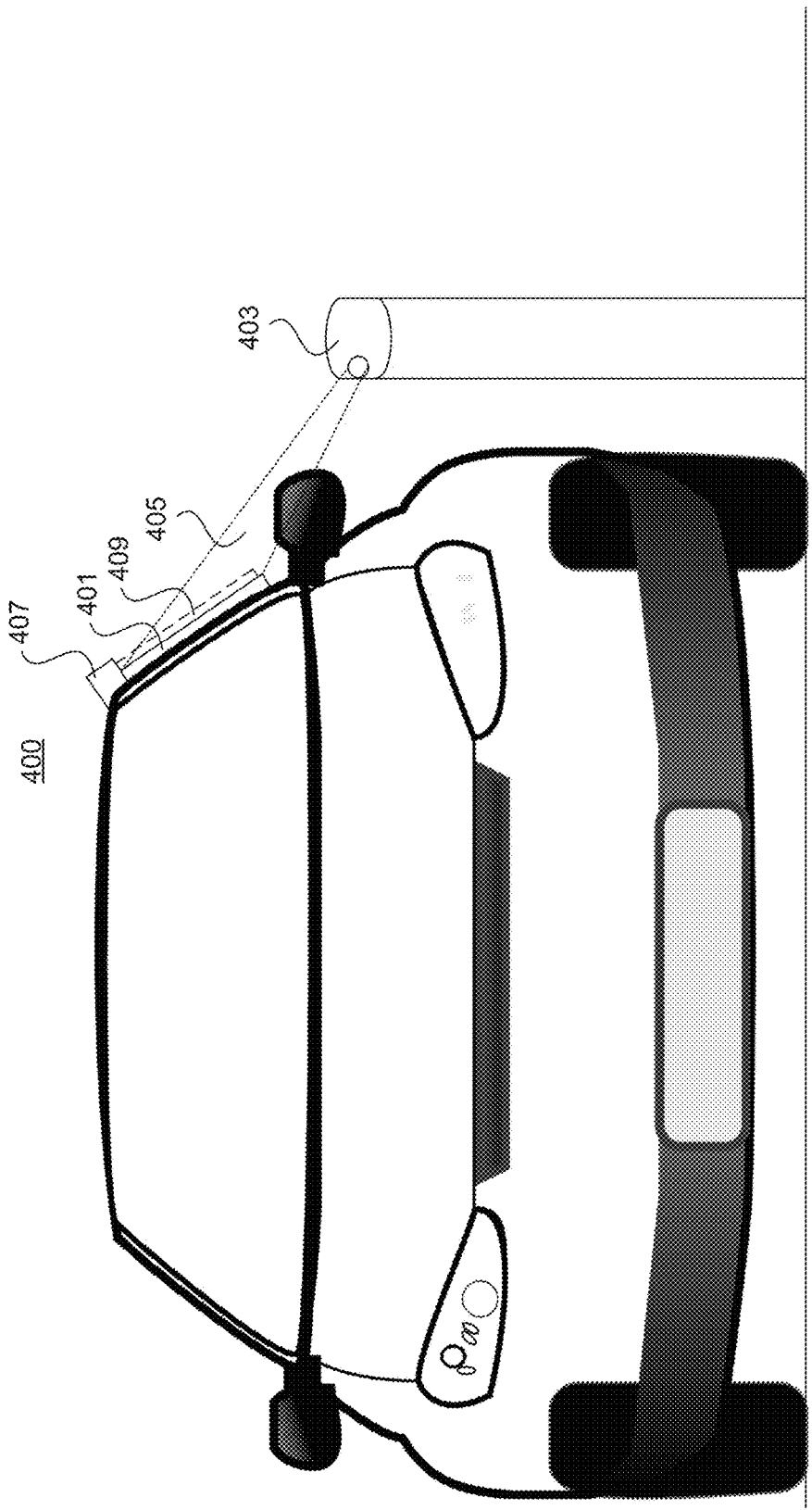
FIG. 4A is a schematic representation of an exemplary interactive projection system used on a vehicle window, consistent with embodiments of the present disclosure.

FIG. 4A is a schematic representation of an example interactive projection system 400 used on a vehicle window. As depicted in FIG. 4A, film 401 is affixed to a surface. In the example of FIG. 4A, the surface comprises a vehicle window. In one embodiment, the surface may be, at least in part, transparent. For example, the surface may comprise glass. In other embodiments, the surface may be opaque. The surface may comprise, for example, a building window, a display case, or the like.

First projector 403 may be configured to project to film 401. As depicted in FIG. 4A, first projector 403 may be configured to project an image 405 onto a surface that is not fully perpendicular to the plane of the first projector. Accordingly, a processor of first projector 403 may perform adjustments to received graphics in order to project the image 405 formed by the graphics onto the non-perpendicular surface without distortion.

As further depicted in FIG. 4A, second projector 407 may be configured to project a plurality of light beams such that the plurality of light beams form a plane 409 above the film that does not intersect the film. Although depicted as parallel to the film in FIG. 4A, plane 409 may alternatively slope towards or away from the film (without intersecting the film). For example, plane 209 formed by the plurality of light beams may form an angle of not more than 10 degrees with a plane of the film.

Figure 4B:
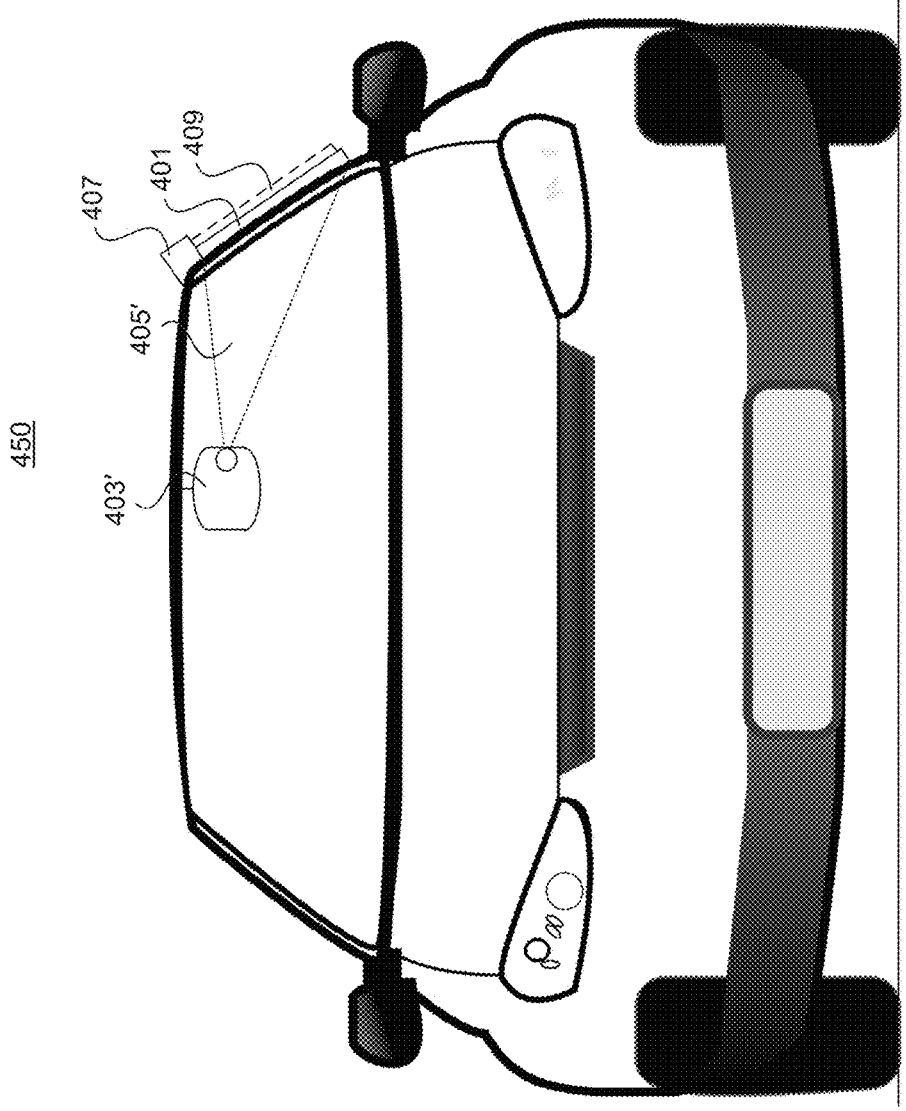
FIG. 4B is a schematic representation of another exemplary interactive projection system used on a vehicle window, consistent with embodiments of the present disclosure.

FIG. 4B is a schematic representation of another example interactive projection system 450 used on a vehicle window. Similar to system 400 of FIG. 4A, in FIG. 4B, film 401 is affixed to a surface comprising a vehicle window, first projector 403' is configured to project to film 401, and second projector 407 is configured to project plane 409. However, as depicted in FIG. 4B, projector 403' may be located inside the vehicle rather than outside (as depicted in FIG. 4A). Accordingly, projector 403' is configured to perform rear projector rather than front projector. Such a configuration may use a processor of projector 403' to perform adjustments to received graphics in order to project the image 405 formed by the graphics without reversing image 405. Moreover, similar to system 400 of FIG. 4A, in FIG. 4B, the processor of projector 403' may also perform adjustments to received graphics in order to project the image 405 formed by the graphics onto the non-perpendicular surface without distortion.

Figure 5:
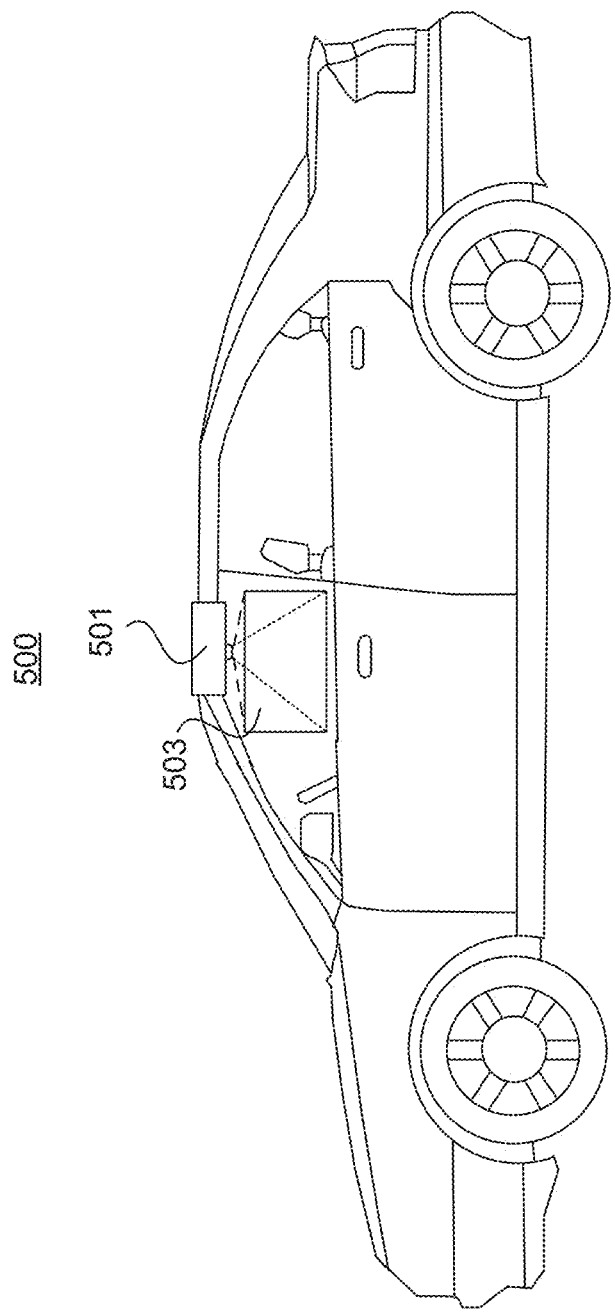
FIG. 5 is a schematic representation of yet another exemplary interactive projection system used on a vehicle window, consistent with embodiments of the present disclosure.

FIG. 5 is another schematic representation of an example interactive projection system 500 used on a vehicle window. As depicted in FIG. 5, film 503 is affixed to a surface. In the example of FIG. 5, the surface is, at least in part, transparent. Indeed, in the example of FIG. 5, the surface comprises glass and further comprises a vehicle window. Other surfaces may be used. For example, in one embodiment, the surface may be opaque.

Projector 501 may be configured to project to film 503. Similar to system 400 and as depicted in FIG. 5, projector 501 may be configured to project an image onto a surface that is not fully perpendicular to the plane of projector. Accordingly, a processor of projector 503 may perform adjustments to received graphics in order to project the image formed by the graphics onto the non-perpendicular surface without distortion. However, as depicted in FIG. 5, projector 501 is used in lieu of a first projector and a second projector. Accordingly, an image sensor of system 500 (not shown) may be configured to receive reflections (or gaps or shadows) caused by the projected user interface.

Although not depicted in FIG. 4A, 4B, or 5, the film (e.g., film 401 or film 503) may include a focusing assistant. For example, the focusing assistant may comprise an embedded beacon that transmits (e.g., wirelessly or by using a wireless communications device) a signal to the first projector (e.g., first projector 403 or first projector 403') or the combined projector (e.g., projector 501) to assist the (first or combined) projector with projecting onto the film. For example, the signal may include an indicator of orientation of the film. Accordingly, the beacon may comprise a magnetometer, a geomagnetic field sensor, or any other positional sensor, or a combination thereof. The signal may further include an indicator of size of the film. For example, the signal may indicate the total dimensions of the film, a center point of the film, a focal point of the film, or the like.

Additionally or alternatively, the focusing assistant may comprise a registration mark having a particular pattern. The (first or combined) projector may capture an image of the registration mark before projection (e.g., via the image sensor used to receive reflections, gaps, or shadows or via a different image sensor) and analyze the image to determine an orientation of the film. Based on the determined orientation and known properties of the film (such as the dimensions of the film, the placement of the registration mark on the film, a focal point of the film, or the like), the (first or combined) projector may project onto the film.

Figure 6:
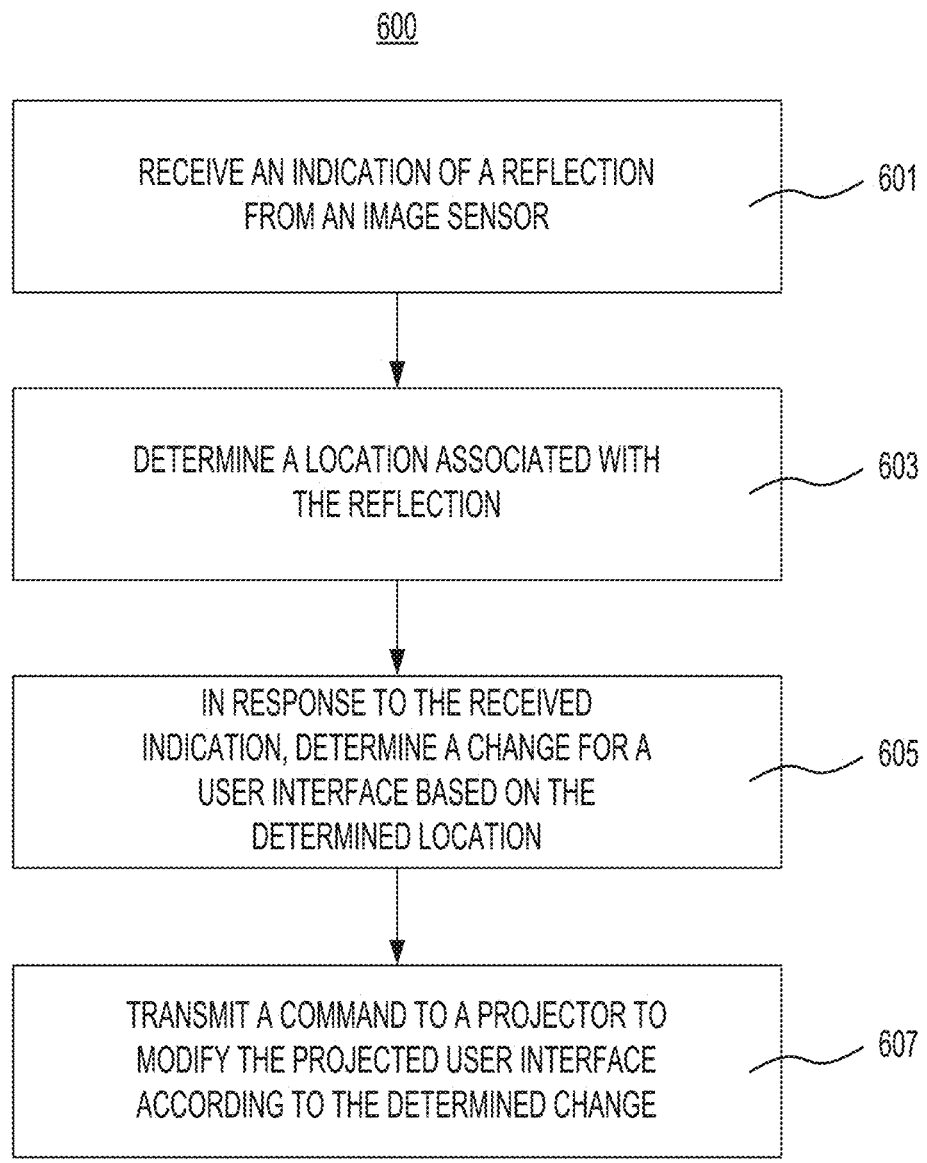
FIG. 6 is a flowchart of an exemplary method for enabling user interaction with a projection system, consistent with embodiments of the present disclosure.

FIG. 6 is a flowchart of exemplary method 600 for enabling user interaction with a projection system. Exemplary method 600 may be implemented by, for example, processor 105 of system 100 of FIG. 1. Exemplary method 600 may further be implemented using another general-purpose computer or special-purpose computer having at least one processor.

At step 601, the processor may receive an indication of a reflection from an image sensor. For example, the image sensor may receive a reflection caused by a plurality of beams projected by a second projector. In embodiments where a combined projector is used instead of a first projector and a second projector, the image sensor may receive a reflection caused by a plurality of beams projected from the combined projector.

The image sensor may send the indication along with one or more properties of the reflection, such as time of receipt of the reflection, angle of receipt of the reflection, wavelength of the reflection, intensity of the reflection, location of the reflection within the field of view of the image sensor, or the like. The indication may be received via a wired connection and/or via a wireless connection.

In some embodiments, the processor may filter the received indication to determine whether it is a false positive. Additionally or alternatively, the image sensor may be configured to filter false positives. For example, the image sensor may be hardwired for a threshold such that the image sensor is not activated unless an intensity of the reflection is above the threshold and/or may include a processing core that only transmits indications if a received reflection is above the same (or a different) threshold. In embodiments where the image sensor detects gaps or shadows, the processor and/or the image sensor may filter gaps or shadows with a size below a particular threshold and/or a sharpness below a particular threshold. Additionally or alternatively, the processor and/or the image sensor may filter gaps or shadows appearing in a number of images below a threshold (e.g., in only one or two images) and/or appearing for a short duration in time (e.g., in one or more images spanning less than 1 second or the like). These same filtering metrics may also be applied to reflections.

At step 603, the processor may determine a location of the reflection. For example, as explained above, the processor may calculate a depth of the reflection, e.g., based on time-of-flight of the reflection, angle of receipt of the reflection, shift in wavelength of the reflection, or the like, and determine the location based on the calculated depth and the location of the reflection within the field of view of the image sensor.

At step 605, in response to the received indication, the processor may determine a change for a user interface based on the determined location. For example, as explained above, the determined change in the user interface may include a popup window, increasing or decreasing a size of at least one component (for example, a window, a graphic, a text box, a button, or the like) of the user interface, increasing or decreasing a transparency of at least one component of the user interface, changing a color of at least one component of the user interface, adding a new component to or removing a component from the user interface, reorganizing at least one component of the user interface, or the like. In another example, the determined change in the user interface may comprise a replacement user interface. In yet another example, the determined change in the user interface may comprise an animation, such as scrolling the user interface.

In some embodiments, determining the change in the user interface may be based on a change in the location over a period of time. For example, a change in location may be indicative of a user dragging her finger on the user interface, which may result in a different change to the user interface than one or more taps. In such embodiments, determining the change in the user interface may further be based on at least one of a magnitude of the change in location or a magnitude of the period of time. For example, the magnitude of the change in location may be used to determine the change in the user interface if the change in location is indicative of a drag-and-drop motion. In another example, the magnitude of the period of time may be used to determine the change in the user interface if the change in location is indicative of a scrolling motion.

At step 607, the processor may transmit a command to a first projector to modify a projected user interface according to the determined change. For example, the processor may transmit the commands including the determined change (e.g., new graphics, new text, new sizes, new transparencies, new user interface, or the like) through a wired connection and/or a wireless connection to the first projector.

Figure 7:
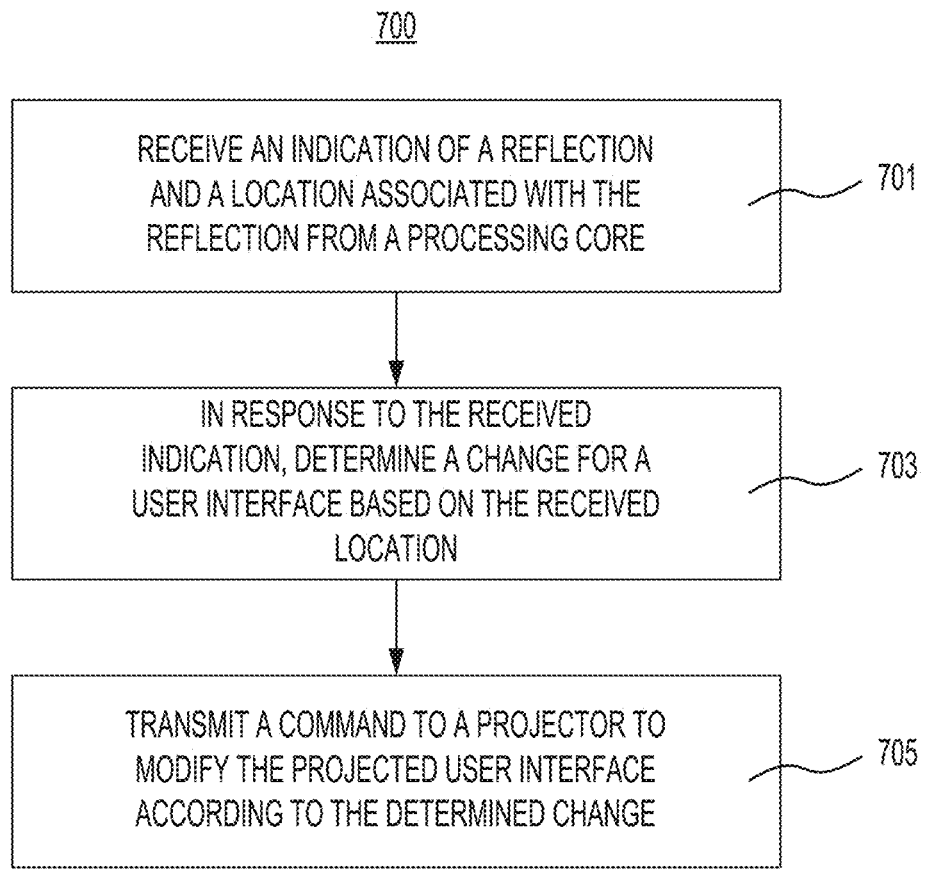
FIG. 7 is a flowchart of another exemplary method for enabling user interaction with a projection system, consistent with embodiments of the present disclosure.

FIG. 7 is a flowchart of another exemplary method 700 for enabling user interaction with a projection system. Exemplary method 700 may be implemented by, for example, processor 105 of system 100 of FIG. 1. Exemplary method 700 may further be implemented using another general-purpose computer or special-purpose computer having at least one processor.

At step 701, the processor may receive an indication of a reflection and a location associated with the reflection from the processing core. For example, the image sensor may receive a reflection caused by a plurality of beams projected by a second projector. In embodiments where a combined projector is used instead of a first projector and a second projector, the image sensor may receive a reflection caused by a plurality of beams projected from the combined projector.

The processing core of the image sensor may determine the location of the reflection. For example, as explained above, the processing core may calculate a depth of the reflection, e.g., based on time-of-flight of the reflection, shift in wavelength of the reflection, or the like, and determine the location based on the calculated depth and the location of the reflection within the field of view of the image sensor. The indication and determined location may be send to the processor via a wired connection and/or via a wireless connection.

In embodiments where the image sensor detects gaps or shadows, the processor and/or the image sensor may filter reflections, gaps or shadows with a size below a particular threshold and/or a sharpness below a particular threshold. Additionally or alternatively, the processor and/or the image sensor may filter gaps or shadows appearing in a number of images below a threshold (e.g., in only one or two images) and/or appearing for a short duration in time (e.g., in one or more images spanning less than 1 second or the like). These same filtering metrics may also be applied to reflections.

In some embodiments, the processor may filter the received indication to determine whether it is a false positive. Additionally or alternatively, the image sensor may be configured to filter false positives. For example, the image sensor may be hardwired for a threshold such that the image sensor is not activated unless an intensity of the reflection is above the threshold and/or may include a processing core that only transmits indications if a received reflection is above the same (or a different) threshold.

At step 703, in response to the received indication, the processor may determine a change for the user interface based on the received location. For example, step 703 may be performed in a manner similar to the operation of step 605 of method 600, described above.

At step 705, the processor may transmit a command to a first projector to modify a projected user interface according to the determined change. For example, similar to step 607 of method 600, the processor may transmit the command including the modified interface (e.g., graphics, text, sizes thereof, transparencies thereof, or the like) through a wired connection and/or a wireless connection to the projector.

Figure 8:
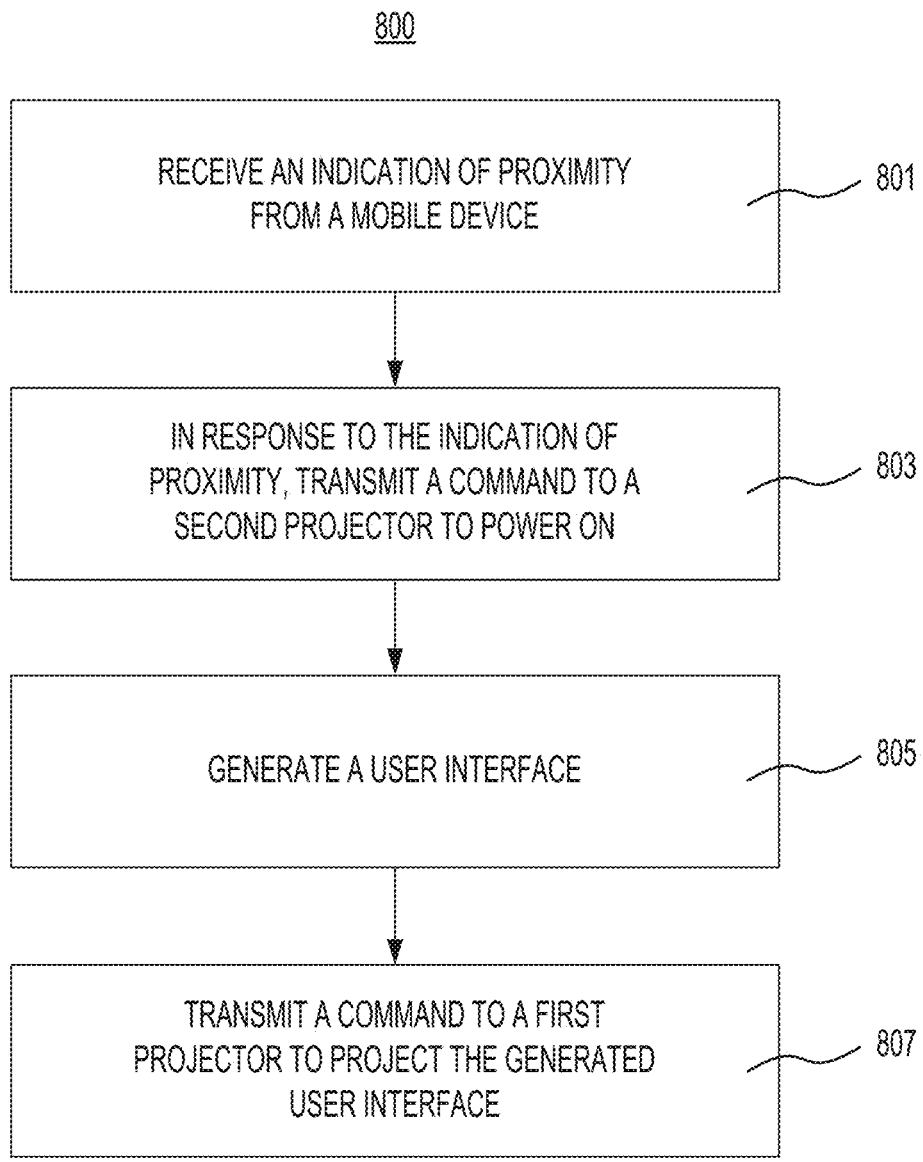
FIG. 8 is a flowchart of an exemplary method for configuring a projection system for proximity-based projection, consistent with embodiments of the present disclosure.

FIG. 8 is a flowchart of exemplary method 800 for configuring a projection system for proximity-based projection. Exemplary method 800 may be implemented by, for example, processor 105 of system 100 of FIG. 1. Exemplary method 800 may further be implemented using another general-purpose computer or special-purpose computer having at least one processor.

At step 801, the processor may receive an indication of proximity of a mobile device. The processor may receive the indication directly from the mobile device or through an intermediary. For example, an intermediary may include a Wi-Fi (or other wireless networking hotspot) to which the mobile device has connected.

The indication of proximity may include a GPS location of the mobile device. Additionally or alternatively, the indication of proximity may include at least one of a received signal strength, a time of arrival, or an angle of arrival of one or more network signals at the mobile device. Accordingly, the processor may determine a location of the mobile device based on the indication and determine proximity by comparing a distance between the determined location to a predetermined location (e.g., at or near one or more components of system 100) with a threshold (e.g., 30 yards, 10 feet, or the like).

At step 803, in response to the indication of proximity, the processor may transmit a command to a second projector to power on. For example, the second projector may be configured to project a plurality of light beams such that the plurality of light beams form a plane above a film that does not intersect a film. Accordingly, the indication of proximity may result in the film being rendered interactive in response to the indication of proximity.

Additionally or alternatively, in response to the indication of proximity, the processor may transmit a command to a first projector to power on. For example, the first projector may be configured to project a user interface onto the film. Accordingly, the indication of proximity may result in the user interface being projected and becoming visible in response to the indication of proximity.

In embodiments where the first projector and/or the second projector are adapted to have a power on mode and a low power mode, the processor may alternatively or additionally transmit a command to the first projector and/or to the second projector switch from the low power mode to the power on mode. In embodiments where the first projector and the second projector comprise a single projector, the processor may transmit a single command to the single projector.

At step 805, the processor may generate a user interface. For example, as explained above, the processor may select one or more graphics, text, and the like and organize the selected components into a user interface. The selected components may be retrieved from one or more memories and/or from one or more remote servers. In some embodiments, generating the user interface may be performed in response to the indication of proximity. For example, the user interface may not be visible until the indication is received, after which the user interface is generated and rendered interactive. In other embodiments, the user interface may have been generated previously. For example, the user interface may be visible but remain static until the indication is received, after which the user interface is rendered interactive.

At step 807, the processor may transmit a command to the first projector to project the generated user interface. For example, the processor may transmit the command including the user interface (e.g., graphics and text comprising the interface along with properties, such as sizes, transparencies, or the like) through a wired connection and/or a wireless connection to the first projector. In some embodiments, transmitting the command may be performed in response to the indication of proximity and/or in response to generating the user interface. For example, as explained above, the user interface may not be visible until the indication is received, after which the user interface is transmitted and rendered interactive. In other embodiments, the command may have been transmitted previously. For example, the user interface may be visible but remain static until the indication is received, after which the user interface is rendered interactive.

Method 800 may further include additional steps. For example, method 800 may further include receive an indication that the mobile device is beyond a proximity threshold. Similar to step 801, the processor may receive the indication directly from the mobile device or through an intermediary.

Similar to the indicator of proximity, the indicator that mobile device is beyond the proximity threshold may include an updated GPS location of the mobile device. Additionally or alternatively, the indication that the mobile device is beyond a proximity threshold may include at least one of an updated received signal strength, an updated time of arrival, or an updated angle of arrival of one or more network signals at the mobile device. Accordingly, the processor may determine an updated location of the mobile device based on the indication and determine that the mobile device is beyond the proximity threshold by comparing a distance between the updated location to a predetermined location (e.g., at or near one or more components of system 100) with the proximity threshold (e.g., 30 yards, 10 feet, or the like).

The processor may be further configured to, in response to the indication that the mobile device is beyond the proximity threshold, transmit a command to the projector to power off. For example, the processor may send the command via a wired connection to the projector and/or via a wireless connection to the projector. In embodiments where the projector is adapted to have a power on mode and a low power mode, the command may be to switch from the power on mode to the low power mode.

Method 800 may be combined with methods 600 and/or 700 such that the proximity-based projection and power control of method 800 may be incorporated into the interactive features of methods 600 and/or 700. For example, after step 807 of method 800, method 600 and/or method 700 may be executed such that the processor receives indications of reflections (or gaps or shadows) caused by the second projector, which may have been powered on at step 803, and then modifies the projected interface in accordance with steps 603-607 of method 600 and/or step 703-705 of method 700.

Figure 9:
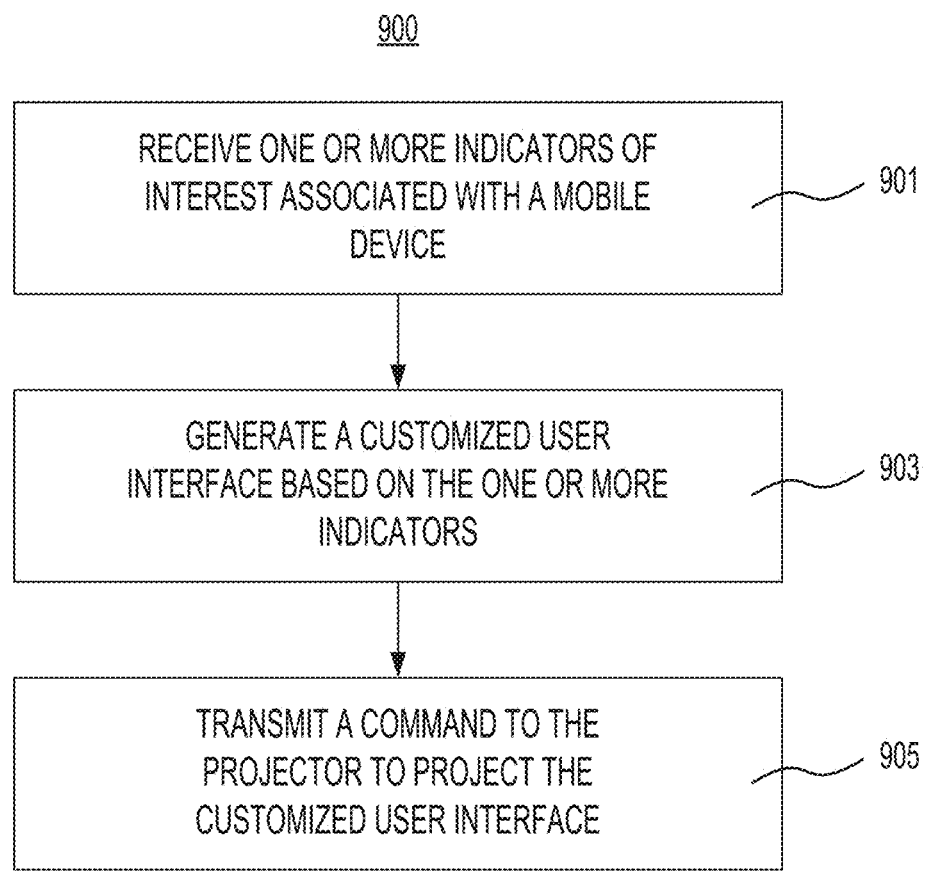
FIG. 9 is a flowchart of an exemplary method for generating a customized user interface for an interactive projection system, consistent with embodiments of the present disclosure.

FIG. 9 is a flowchart of exemplary method 900 for generating a customized user interface for an interactive projection system. Exemplary method 900 may be implemented by, for example, processor 105 of system 100 of FIG. 1. Exemplary method 900 may further be implemented using another general-purpose computer or special-purpose computer having at least one processor.

At step 901, the processor may receive one or more indicators of interest associated with a mobile device. For example, the processor may receive the indicators from one or more applications running on the mobile device. Additionally or alternatively, the processor may use an authorization obtained from the mobile device to retrieve the indicators form one or more remote servers. For example, the process may have obtained the authorization from an intermediary, such as a Wi-Fi device (or other wireless networking hotspot), that the mobile device provided upon connecting to the intermediary. For example, the mobile device may provide the authorization as a condition of connecting to the intermediary and/or of receiving access to a network (such as an Internet) through the intermediary.

At step 903, the processor may generate a customized user interface based on the one or more indicators. For example, as explained above, the processor may select and/or organize one or more components comprising the customized user interface to prioritize components aligned with the indicators of interest. For example, the processor may map the indicators of interest to one or more predetermined profiles having one or more characteristics and may select the components using a relational database indexing characteristics to user interface components. Additionally or alternatively, the processor may determine strength scores for each indicator of interest and then organize the selected components to prioritize those matching indicators with the highest scores.

In some embodiments, the processor may determine one or more automotive preferences based on the one or more indicators and then generate the customized user interface based on the one or more automotive preferences. For example, the one or more automotive preferences may include at least one of gas mileage, horsepower, towing capacity, trunk space, number of seats, or acceleration. As explained above, the indicators may be mapped to one or more automotive preferences, e.g., using a relational database and/or a feature model. Accordingly, generating the customized user interface may be based on the one or more automotive preferences, similar to the generation based on the indicators explained above.

At step 905, the processor may transmit a command to the first projector to project the customized user interface. For example, the processor may transmit the command in a manner similar to the transmission of step 807, described above.

Method 900 may further include additional steps. For example, method 900 may further include receiving an indication that the mobile device is beyond a proximity threshold. For example, the processor may receive the indication directly from the mobile device or through an intermediary (e.g., the intermediary used in step 901, described above).

As explained above, the indication of proximity may include a GPS location of the mobile device. Additionally or alternatively, the indication of proximity may include at least one of a received signal strength, a time of arrival, or an angle of arrival of one or more network signals at the mobile device. Accordingly, the processor may determine a location of the mobile device based on the indication and determine proximity by comparing a distance between the determined location to a predetermined location (e.g., at or near one or more components of system 100) with a threshold (e.g., 30 yards, 10 feet, or the like).

Additionally or alternatively, method 900 may include receiving a second indication of proximity of a second mobile device. For example, the processor may receive GPS coordinates and/or other positional indicators from which the processor may determine a location of the second mobile device, or may receive the location directly from the second mobile device and may then determine whether the location of the second mobile device is within a particular threshold that may comprise the proximity threshold.

In response to the indication that the mobile device is beyond the proximity threshold and/or in response to the second indication, the processor may generate a default user interface and transmit a command to the first projector replace the customized user interface with the default user interface. The "default user interface" may comprise a selection and/or organization of one or more components comprising the customized user interface that is not based on particular indicators of interest (or automotive preferences). For example, the processor may transmit the command in a manner similar to step 905, described above.

Method 900 may be combined with any of method 800 such that the generation of customized user interfaces may be combined with the proximity-based projection and power control of method 800. For example, method 900 may replace steps 805 and 807 of method 800 such that a customized user interface is generated and projected rather than a generic user interface. Moreover, the customized user interfaces (and/or default user interfaces) described above may be rendered interactive, e.g., by combining method 1200 with method 600 and/or method 700.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented with hardware alone. In addition, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including reordering steps and/or inserting or deleting steps.

Instructions or operational steps stored by a computer-readable medium may be in the form of computer programs, program modules, or codes. As described herein, computer programs, program modules, and code based on the written description of this specification, such as those used by the controller, are readily within the purview of a software developer. The computer programs, program modules, or code can be created using a variety of programming techniques. For example, they can be designed in or by means of Java, C, C++, assembly language, or any such programming languages. One or more of such programs, modules, or code can be integrated into a device system or existing communications software. The programs, modules, or code can also be implemented or replicated as firmware or circuit logic.

The features and advantages of the disclosure are apparent from the detailed specification, and thus, it is intended that the appended claims cover all systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A system for projecting a user interface onto a film, the system comprising:
a film affixed to a surface;
a first projector configured to project a user interface onto the film;
a second projector adapted to have a power on mode and a low power mode and configured to project a plurality of light beams such that the plurality of light beams form a plane above the film that does not intersect the film;
an image sensor configured to receive reflections caused by the projected plurality of light beams; and
at least one processor configured to perform operations comprising:
receiving an indication of proximity of a first mobile device,
in response to the indication of proximity of the first mobile device, transmitting a command to the second projector to switch from the low power mode to the power on mode,
generating a user interface and transmitting a command to the first projector to project the generated user interface,
receiving one or more indicators of interest associated with the first mobile device,
generating a customized user interface based on the one or more indicators associated with the first mobile device,
transmitting a command to the first projector to project the customized user interface,
receiving an indication of proximity of a second mobile device,
in response to the indication of proximity of the second mobile device, generating a default user interface comprising one or more components different from the customized user interface that was generated based on the one or more indicators of interest associated with the first mobile device, and
transmitting a command to the first projector replace the customized user interface with the default user interface.

2. The projection system of claim 1, wherein the first projector is adapted to have a power on mode and a low power mode, and the operations further comprise, in response to the indication of proximity, transmitting a command to the first projector to switch from the low power mode to the power on mode.

3. The projection system of claim 2, wherein the user interface is generated in response to the indication of proximity, and the command to project the generated user interface is transmitted in response to the indication of proximity.

4. The projection system of claim 2, wherein the operations further comprise:
receiving an indication that the mobile device is beyond a proximity threshold, and
in response to the indication that the mobile device is beyond the proximity threshold, transmitting a command to the first projector to switch from the power on mode to the low power mode and transmitting a command to the second projector to switch from the power on mode to the low power mode.

5. The projection system of claim 1, wherein the operations further comprise:
receiving an indication that the mobile device is beyond a proximity threshold, and
in response to the indication that the mobile device is beyond the proximity threshold, transmitting a command to the second projector to switch from the power on mode to the low power mode.

6. A system for projecting a user interface onto a film, the system comprising:
a film affixed to a surface;
a first projector configured to project a user interface onto the film;
a second projector adapted to have a power on mode and a low power mode and configured to project a plurality of light beams such that the plurality of light beams form a plane above the film that does not intersect the film;
an image sensor configured to receive reflections caused by the projected plurality of light beams and having a processing core configured to determine locations associated with received reflections; and
at least one processor configured to perform operations comprising:
receiving an indication of proximity of a first mobile device,
in response to the indication of proximity of the first mobile device, transmitting a command to the second projector to switch from the low power mode to the power on mode,
generating a user interface and transmitting a command to the first projector to project the generated user interface,
receiving one or more indicators of interest associated with the first mobile device,
generating a customized user interface based on the one or more indicators associated with the first mobile device,
transmitting a command to the first projector to project the customized user interface,
receiving an indication of proximity of a second mobile device,
in response to the indication of proximity of the second mobile device, generating a default user interface comprising one or more components different from the customized user interface that was generated based on the one or more indicators of interest associated with the first mobile device, and
transmitting a command to the first projector replace the customized user interface with the default user interface.

7. The projection system of claim 6, wherein the first projector is adapted to have a power on mode and a low power mode, and the operations further comprise, in response to the indication of proximity, transmitting a command to the first projector to switch from the low power mode to the power on mode.

8. The projection system of claim 7, wherein the user interface is generated in response to the indication of proximity, and the command to project the generated user interface is transmitted in response to the indication of proximity.

9. The projection system of claim 7, wherein the operations further comprise:
receiving an indication that the mobile device is beyond a proximity threshold, and
in response to the indication that the mobile device is beyond the proximity threshold, transmitting a command to the second projector to switch from the power on mode to the low power mode and transmitting a command to the first projector to switch from the power on mode to the low power mode.

10. The projection system of claim 6, wherein the operations further comprise:
   receiving an indication that the mobile device is beyond a proximity threshold, and
   in response to the indication that the mobile device is beyond the proximity threshold, transmitting a command to the second projector to switch from the power on mode to the low power mode.

11. The projection system of claim 6, wherein the image sensor comprises at least one of a charge-coupled device and a complementary metal-oxide-semiconductor.

12. The projection system of claim 6, wherein the surface is, at least in part, transparent.

13. The projection system of claim 12, wherein the surface comprises glass.

14. The projection system of claim 13, wherein the surface comprises a vehicle window.

15. The projection system of claim 6, wherein the surface is opaque.

16. A system for projecting a user interface onto a film, the system comprising:
   a film affixed to a surface;
   a projector adapted to have a power on mode and a low power mode and configured to project a user interface onto the film and including an image sensor configured to receive reflections caused by the projected user interface; and
   at least one processor configured to perform operations comprising:
      receiving an indication of proximity of a first mobile device,
      in response to the indication of proximity of the first mobile device, transmitting a command to the projector to switch from the low power mode to the power on mode,
      generating a user interface and transmitting a command to the projector to project the generated user interface,
      receiving one or more indicators of interest associated with the first mobile device,
      generating a customized user interface based on the one or more indicators associated with the first mobile device,
      transmitting a command to the projector to project the customized user interface,
      receiving an indication of proximity of a second mobile device,
      in response to the indication of proximity of the second mobile device, generating a default user interface comprising one or more components different from the customized user interface that was generated based on the one or more indicators of interest associated with the first mobile device, and
      transmitting a command to the projector replace the customized user interface with the default user interface.

* * * * *

UNITED STATES PATENT AND TRADEMARK OFFICE
CERTIFICATE OF CORRECTION

PATENT NO. : 10,345,965 B1  
APPLICATION NO. : 16/165382  
DATED : July 9, 2019  
INVENTOR(S) : Qiaochu Tang et al.

Page 1 of 1

It is certified that error appears in the above-identified patent and that said Letters Patent is hereby corrected as shown below:

In the Claims

Claim 1, Column 19, Lines 44-45, "a command to the first projector replace the customized user interface" should read -- a command to the first projector to replace the customized user interface --.

Claim 6, Column 20, Lines 48-49, "a command to the first projector replace the customized user interface" should read -- a command to the first projector to replace the customized user interface --.

Claim 16, Column 22, Lines 28-29, "a command to the first projector replace the customized user interface" should read -- a command to the first projector to replace the customized user interface --.

Signed and Sealed this  
Third Day of March, 2020

Andrei Iancu  
*Director of the United States Patent and Trademark Office*